United States Patent

[11] 3,626,213

[72] Inventor Sigurd G. Waaben
Princeton, N.J.

[21] Appl. No. 781,167
[22] Filed Dec. 4, 1968
[45] Patented Dec. 7, 1971
[73] Assignee Bell Telephone Laboratories, Incorporated
Murray Hill, Berkeley Heights, N.J.

[54] CIRCUIT EMPLOYING CHARGE STORAGE DIODE IN FAST DISCHARGE MODE
6 Claims, 2 Drawing Figs.

[52] U.S. Cl. .................................................. 307/281,
307/246, 307/267, 307/319
[51] Int. Cl. .................................................. H03k 3/26,
H03k 17/74
[50] Field of Search ........................................ 307/319,
281

[56] References Cited

UNITED STATES PATENTS

| | | | |
|---|---|---|---|
| 2,892,979 | 6/1959 | Ogletree ...................... | 307/281 |
| 3,129,354 | 4/1964 | Hellstrom .................... | 307/281 |
| 3,391,286 | 6/1968 | Lo Casale et al. ............ | 307/319 |

*Primary Examiner*—Donald D. Forrer
*Assistant Examiner*—Harold A. Dixon
*Attorneys*—R. J. Guenther and Kenneth B. Hamlin

ABSTRACT: The current output amplitude of a charge storage diode in its reverse conducting condition is absolutely limited by detecting the attainment of a predetermined output level and in response thereto applying an aiding feedback to the diode to terminate the current rapidly by purging the remaining carriers at a much faster rate. This mode of diode operation is employed with current detection in a memory drive circuit. One aspect of the fast diode discharge mode is also employed in a time shared sample and hold circuit.

INVENTOR
S. G. WAABEN
BY
Charles Scott Phelan
ATTORNEY

CIRCUIT EMPLOYING CHARGE STORAGE DIODE IN FAST DISCHARGE MODE

BACKGROUND OF THE INVENTION

Field of the Invention

This invention relates to discharge control circuits for charge storage diodes and it relates in particular to such control circuits in which an output spike discharge is produced from the diode.

Description of the Prior Art

The current carrier storing capabilities of charge storage diodes have been long known in the art, and such storage capabilities have been increasingly turned to advantage as, for example, in the copending application Ser. No. 679,859, filed Nov. 1, 1967, of J. D. Heightley, C. B. Roundy, and S. G. Waaben, which was entitled "Interlaced Current Pulse Configuration Control." Such diodes have been heretofore discharged in a controllable manner through load circuits to produce predetermined load circuit effects, and wherein the load circuit has a significant time constant. A discharge current pulse from a charge storage diode in such circuits is relatively broad and occupies a time interval with a duration which depends upon the impedance characteristics of the mentioned load circuit.

It is one object of the present invention to utilize a spike discharge mode of operation for a charge storage diode and wherein the diode discharge time is relatively free of load circuit dependence.

It is also known in the art to use charge storage diodes to produce a current pulse of predetermined maximum current-time area limitation and advantageously to utilize such pulse for an amplitude limited drive pulse. However, it has been found that there are certain circuit variations which can prevent the total charge stored in such a diode from generating the desired maximum current magnitude. Accordingly, it is necessary in some systems, such as magnetic memory systems, to design the magnetic storage devices with storage tolerances which are sufficiently restricted to accommodate the anticipated variations in drive pulse magnitude. One known technique for meeting such conditions is to supply and excess current and provide pulse amplitude or time limiting means to prevent the drive pulse from exceeding a predetermined amplitude, or to prevent the pulse from continuing beyond a predetermined duration. However, pulse limiting systems of the mentioned types usually require switching elements which have the undesirable effect of slowing down the overall drive system speed of operation.

It is, therefore, another object of the invention to limit the amplitude of duration of a discharge output pulse from a charge storage diode by circuits which are both inexpensive and rapid in operation.

SUMMARY OF THE INVENTION

The aforementioned and other objects of the invention are realized in an illustrative embodiment in which a charge storage diode is discharged by the application of a current pulse of sufficient magnitude to discharge the diode almost instantaneously with a spike of current in a circuit path of low impedance. A current spike is herein considered to mean a current pulse in which the pulse rise and fall times are determined primarily by the bulk resistance of semiconductor devices in the circuit in which the current spike flows because all such devices operate in a saturated condition, i.e. a condition in which current can be increased without substantially changing the potential difference across the device.

It is one feature of the invention that the diode discharge current amplitude is limited primarily by the bulk resistance of any semiconductor devices in the discharge path.

It is a feature of an embodiment of the invention that a charge storage diode is initially discharged into a predetermined load at a first rate; and, upon the attainment of a discharge pulse amplitude of predetermined size, a supplemental discharge current of large magnitude is driven through the diode for completing the discharge thereof in the spike current fashion hereinbefore noted.

BRIEF DESCRIPTION OF THE DRAWING

A more complete understanding of the invention and its various features, objects, and advantages may be obtained from a consideration of the following description when taken in connection with the appended claims and the attached drawing in which:

DETAILED DESCRIPTION

Figures 1, 1A:
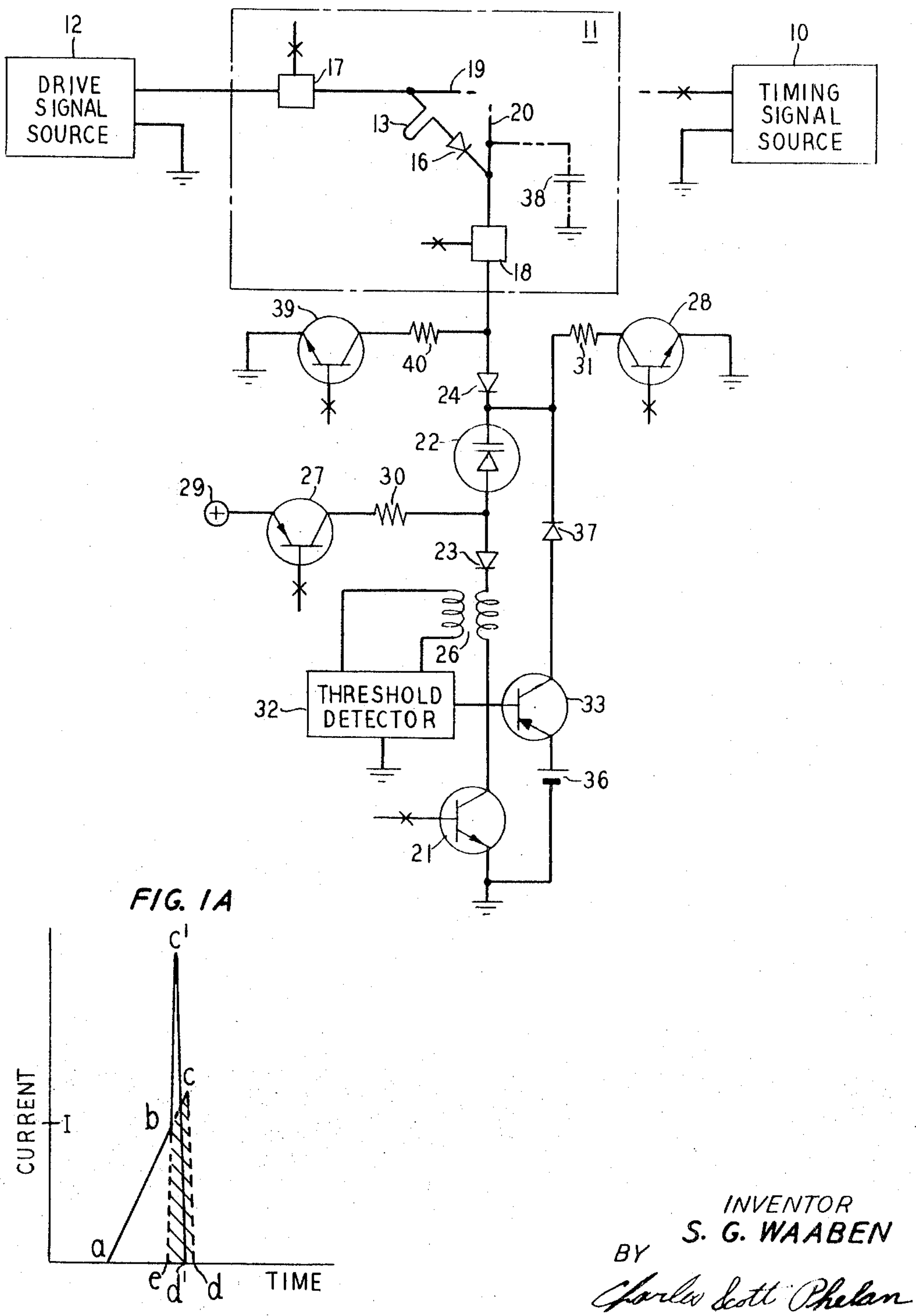
FIG. 1 is a schematic diagram of a magnetic memory drive circuit utilizing one aspect of the invention.
FIG. 1A is a current wave diagram illustrating the operation of one aspect of the invention.

In FIG. 1 a timing signal source 10 supplies pulse-type signals in a predetermined sequence through an output circuit lead, indicated by an X, to similarly designated circuit leads for the magnetic store system shown in simplified form. A diode access matrix 11 is operated in a manner well known in the art in response to address signals from a source, not shown, for coupling the output of a drive signal source 12 to a word drive circuit 13 of an associated magnetic memory. The circuit 13 and an associated diode 16 connected in series therewith comprise one of a plurality of cross-point load circuits for the matrix 11. Such a load is generally inductive in a memory system. Only one cross-point load circuit and associated matrix rails are shown because matrix details are known in the art and are unnecessary to an understanding of the present invention.

Timing signals from source 10 actuate selection switches 17 and 18 in a word rail 19 and a diode rail 20, respectively, of the matrix. The actuated selection switches establish a current path through the matrix. At the same time, the source 10 supplies a further drive pulse to a common current control transistor 21. That transistor is driven into saturated conduction to complete the circuit path from the drive signal source 12 through the matrix 11, a diode 24, a charge storage diode 22, a further diode 23, the primary winding of a current transformer 26, and the transistor 21 to ground. The transistor 21 and diodes 23 and 24 are poled in the same direction as the cross-point diode 16 for the forward conduction of current from the drive signal source 12. Charge storage diode 22 is, however, poled for forward conduction of current in the opposite direction in the aforementioned drive signal circuit. Consequently, diode 22 is unable to conduct unless it has first conducted sufficient forward current to accumulate an excess of current carriers therein as is known in the art.

Prior to the aforementioned operation of the selector switches 17 and 18 and transistor 21, timing signal source 10 actuates two transistors 27 and 28 by the application of negative and positive timing pulses to their respective base electrodes for driving them into saturated conduction. In that condition the transistors 27 and 28 conduct current from a positive source 29 through a current limiting resistor 30, the diode 22, and a further current limiting resistor 31.

The source 29 is schematically represented by a circled plus sign which indicates the positive terminal of a suitable source of potential, not otherwise shown, which has its other terminal connected to ground. Similar schematic representations for sources are used throughout the drawings with the circled polarity sign indicating the source terminal to which the circuit is connected.

When the desired charge level has been stored in the diode 22, by storing excess current carriers therein, the transistors 27 and 28 are disabled and the stored charge is isolated in the diode until such time as a discharge current path is provided. The exact amount of charge to be stored is, in accordance with one aspect of the present invention, not critical as long as it is at least equal to the maximum amount required to supply the necessary drive pulse amplitude to circuit 13 under worst case conditions.

As previously noted, the timing signal source subsequently enables a first discharge path for the diode 22 by establishing the aforementioned drive signal circuit from the source 12 through the matrix 11. The resulting drive pulse through diode 22 initiates discharge of that diode by purging the diode of carriers at a first predetermined rate. That rate is adapted to produce a drive current pulse to the memory word circuit 13 of more than the required amplitude and duration. Such drive pulse is configured in accordance with the circuit impedances and typically has a general triangular configuration with a comparatively broad base. An example of such a pulse is the triangular pulse *a–c–d* in FIG. 1A. The base duration is a function of the pulse rise and fall times which are determined by the circuit impedances and the characteristics of source 12.

Current transformer 26 couples the increasing drive signal pulse amplitude to a threshold detector 32 which, upon attainment of its threshold, provides a negative-going output signal to a PNP-transistor switch 33. The threshold is established at the predetermined maximum drive pulse amplitude to be applied to circuit 13. Current transformer 26 typically has a substantially short-circuited turn for a secondary winding so that it presents no significant inductance to the main drive circuit through drive signal source 12 and control transistor 21. Details of threshold detector 32 are not shown because they do not comprise a part of the invention and arrangements therefor are known in the art. In one embodiment, for example, the secondary winding of current transformer 26 drives a buffer amplifier in the form of a common base transistor circuit which operates from the low-impednace output of the current transformer and provides a high-impedance output to a Schmitt trigger circuit. The output of the latter circuit is the detector output which is applied between ground and the base electrode of transistor 33.

Transistor 33 is driven into saturated conduction to provide a current path from a battery 36 through an isolating diode 37 to the charge storage diode 22. The current thus provided to the charge storage diode is in aiding relationship with respect to the current from the driven signal source 12 and increases the discharge rate of the diode so that the remaining current carriers stored therein are purged from the diode almost instantaneously to produce an output current spike.

That spike of current for diode 22 is represented by the solid-line part *b–c′–d′* in FIG. 1A for the case wherein current amplitude for circuit 13 is to be limited at current level I corresponding to point *b* in the figure. Since the same amount of charge must be removed from diode 22 either with or without the present invention, the cross-hatched quadrangular area *b–c–d–e* must equal the narrow nearly triangular area *b–c′–d′–e*.

Several factors must be taken into account in providing for a spike discharge of diode 22. It is necessary that the discharge occur so fast that there will be no injury to circuit elements either as a result of overheating or excessive forward or reverse voltages. Also, if the load, i.e., circuit 13, is to have an amplitude limit imposed upon it, that limit should not be exceeded. These factors are taken into account by the design of the described supplemental discharge current loop including transistor 33. For practical purposes the only impedances loading the batter 36, and thus limiting the spike amplitude, are the bulk resistances of the semiconductor devices including transistor 33; diodes 37, 22, and 23; and transistor 21. Leakage capacitance effects are nominal because such capacitances have already been charge to some extent during the initial part of the drive pulse; and they do not, therefore, constitute significant loading on battery 36 during spike discharge. It has already been noted that current transformer 26 adds no significant inductance, and the described supplemental current loop is designed to enclose the smallest possible area to keep its inductance to a minimum.

Diode 24 is a type now well known in the art which has low-charge storage capabilities and does not support significant reverse current during the supplemental current spike. Thus, the supplement current amplitude is limited only by the bulk resistances of the loop semiconductor devices and the amount of remanent charge in diode 22. Discharge is then realized almost instantaneously in a circuit of very low time constant.

Upon the exhaustion of the charge in diode 22 there is no longer a current path to accommodate the supplemental current, or to accommodate the drive signal current from the source 12, because both such currents are then confronted with the extremely high reverse impedance of the diode 22. The switching transistor 33 in the supplemental current loop does not slow down overall drive system operation because transistor turn-on times are generally quite fast and the turnoff operation is charge-limited by diode 22. The minimum value for the supplemental current pulse supplied through transistor 33 is dictated by the maximum amount of charge which is expected to remain in diode 22 under worst case conditions and the impedance of the drive signal circuit as seen from the cathode side of diode 37. Considering those impedances, the supplemental current pulse must be of sufficient amplitude to purge the diode 22 of the mentioned remanent charge practically instantaneously. A comparatively small battery 36 performs adequately since the operation of diode 22 makes it unnecessary for battery 36 to impose a reverse bias on diode 24.

It would, of course, be possible in accordance with prior art circuit techniques to apply the output of the threshold detector 32 to the base electrode of control transistor 21 for turning off that transistor upon the attainment of the desired current amplitude. However, it is well known that such transistors operate in a comparatively slow fashion during the turnoff aspect of their functioning. By comparison, the purging of remanent charge from diode 22 provides a fast and sharp turnoff of the drive signal from source 12.

The diode 23, which is connected in series in the drive signal circuit path as previously outlined, is not essential to the basic operation of the invention. It is provided because charge storage diodes such as the diode 22 are known to turn on quite sharply when they begin conduction in the reverse direction to remove stored charge. This sharp turn-on produces objectionable noise in some applications of the circuit. The use of the diode 23 in series superimposes the softer turn-on characteristics in the forward direction upon the sharp reverse turn-on characteristics of the diode 22 to produce a net, slightly rounded characteristic which avoids the aforementioned objectionable noise.

A transistor 39 is also provided for holding drive current amplitude at a predetermined level. The collector-emitter current path of the transistor is connected through a collector load resistor 40 between ground and the drive signal circuit at the diode rail 20. Transistor 39 is turned on by a positive output pulse from the timing signal source 10, subsequent to the turn-on of the transistor 21 but prior to the turn-on of the transistor 33 for extinguishing diode 22. The transistor 39 provides a holding current path that is utilized only in those applications of the system wherein it is desired to bring the drive current up to a predetermined level and hold it there for a fixed time which is longer than the current of that level could be sustained by diode 22. In those cases the previously described supplemental current circuit for the diode 22 serves only to prevent an excess current level from being attained while the system is coming up to the level which is to be held by transistor 39. Diode 24 isolates the circuit of transistor 39 from the supplemental current circuit to prevent supplemental current shunting through the transistor.

Although the present invention has been described in connection with particular embodiments thereof, it is to be understood that additional embodiments and modifications which will be obvious to those skilled in the art are included within the spirit and scope of the invention.

We claim:

1. In combination, a charge storage diode having a predetermined excess of current carriers stored as an electrical charge therein, and means discharging said diode at least in part by producing a spike of current therethrough in a reverse conduction direction for the diode, said discharging means comprising means driving a first current through said circuit including said diode in said reverse conduction direction, means detecting a predetermined level of said current, and means responsive to the detection of said level for increasing current in said diode.

2. The combination in accordance with claim 1 in which said driving means includes inductive means.

3. The combination in accordance with claim 1 in which said detecting means includes a current amplitude detector for producing an output signal in response to the attainment of said level, and said current increasing means includes means responsive to said output signal and connected for applying additional current to said diode in aiding relationship with respect to the first-mentioned current.

4. The combination in accordance with claim 3 in which said detecting means includes a current transformer having its primary winding connected in series with said diode for receiving said first current.

5. The combination in accordance with claim 4 in which said additional current applying means, said diode, and said transformer comprise a circuit loop having predominantly resistive impedance.

6. The combination in accordance with claim 5 in which said circuit loop includes semiconductor means, and said resistive impedance comprises primarily bulk resistance of said semiconductor means.

* * * * *